W. Davis,
Reciprocating Saw Mill,
No. 7,234.          Patented Apr. 2, 1850.
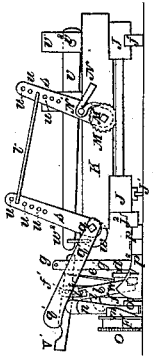
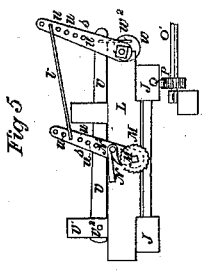
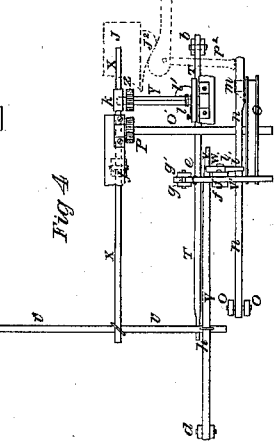
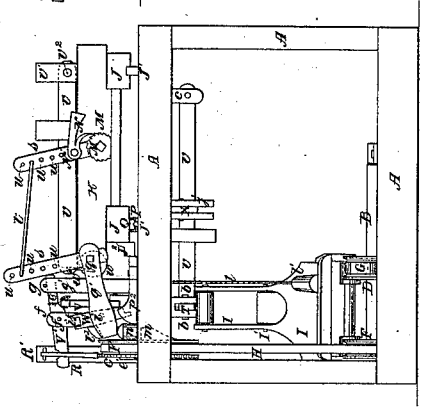
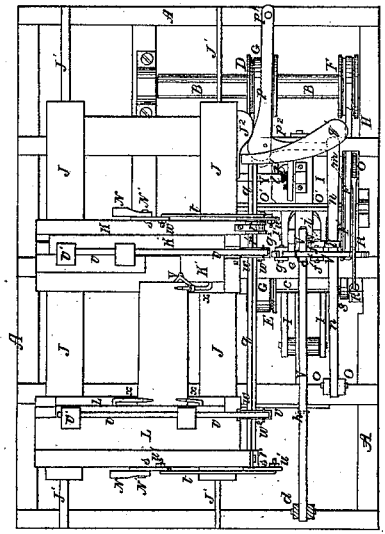
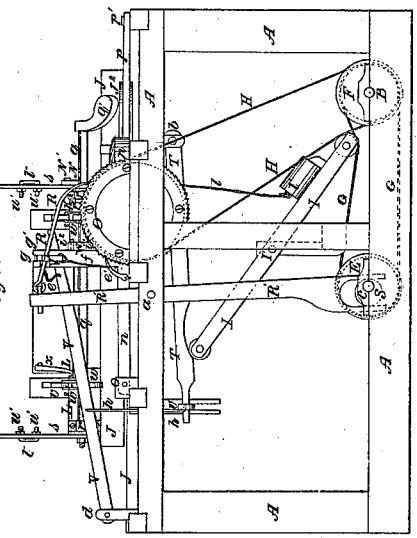

UNITED STATES PATENT OFFICE.

WAITMAN DAVIS, OF NEAR GRANVILLE, VIRGINIA.

SAWMILL.

Specification of Letters Patent No. 7,234, dated April 2, 1850.

*To all whom it may concern:*

Be it known that I, WAITMAN DAVIS, of near Granville, in the county of Monongalia and State of Virginia, have invented certain new and useful Improvements in Sawmills for Sawing Logs Into Timber, reference being had to the drawings hereunto annexed and making part of this specification.

Figure 1, represents a plan or top view of the machine,—the carriage having been gigged back and the log set for the action of the saw. Fig. 2, is a side elevation of the same. Fig. 3, is an end elevation,—looking toward the head block of the carriage. Fig. 4, is a plan, showing the arrangement of the levers, &c. Fig. 5, is an end view of the tail block, upright turning gage bars, &c. Fig. 6, is an end view of the head block, gauge bars weighted turning bars, &c., in the act of setting the log.

The letters used on the parts of the several figures indicate the same parts.

A, is the frame. B, the propelling shaft. C, is the crank shaft to which the pitman rod of the saw gate is attached. D, E, F, are pulleys on the shafts B and C. G, is a band leading from D to E. H, is a band leading from F, to a large pulley F' on the axle of the rag wheel.

I, is a tightening lever turning on a pin I' for alternately pressing upon and against the bands G and H for actuating the saw gate, and gigging back the carriage.

J, is the carriage. J' J' are the ways over which it moves back and forth.

K, is the head block.

L, is the tail block.

K' and L' are the slides of the head and tail blocks, to which the log is dogged.

These slides are provided with racks on their underside into which match pinions secured on the inner ends of horizontal transverse shafts M' M' in the usual manner. M, M, are two pinions fixed on the outer ends of the transverse shafts M' of the head and tail blocks. N, N, are two weighted pawls secured to bars or pins N' N' fixed on the outer ends of the transverse shafts M' M' and matching with the teeth of the pinions M M.

O, is the rag wheel. O' is the shaft of the rag wheel. P, is a pinion on the inner end of the shaft O' for matching into the rack Q on the underside of the carriage J, for feeding, and gigging back the carriage.

R, is the reaching arm secured to the upper end of a vibrating bar R' fastened to the frame by a bolt (*a*) on which it is made to vibrate by a cam S, on the outer end of the crank shaft C, for rotating the rag wheel to feed the carriage and log toward the saw. The arrangement and combination of the aforesaid parts are similar to those in use in other saw mills.

My improvements relate to the peculiar manner of arranging and operating certain levers, and bars seen in Fig. 4 by the depression of a foot lever, and the agency of two cams, one projecting from the rag wheel, and the other from the front end of the carriage, by which the several levers and bars, are actuated so as to disengage the reaching arm, and pawl, from the rag wheel, and operate a turning bar to set the ends of the log simultaneously for another cut; and after which, at the same operation elevate the foot lever and engage the reaching arm with the rag wheel to feed the carriage to the saw. And to the manner of combining upright gage, setting bars, attached to the head and tail blocks of the carriage, with a horizontal weighted turning bar, having thereon two eccentrics which are attached by loops or rods, to the ends of two bars, for holding the slides K' and L during the operation of sawing, and releasing the same, when setting the log. Also the arrangement of a shaft parallel with the shaft of the rag wheel, having on its end a pinion for engaging with the rack of the carriage, simultaneously with the descent of the foot lever for winding up a cord and weight attached thereto for relieving the tightening lever from the band G, and unwinding the same after the setting of the log, and gigging back of the carriage, to give motion to the crank shaft C.

T is a lever secured to the frame near the rag wheel by a bolt (*b*) on which it turns and extends longitudinally toward the tail block and connects with the rising and falling end of a transverse lever *v*, secured at its opposite end to the frame by a bolt (*c*)—

V, is the foot lever secured on the frame by a bolt (*d*) extending toward the rag wheel and connected to a disengaging bar V by a cord (*e*) said bar being secured to the top of a post (*f*) by a pin (*f'*) and projecting beneath the reaching arm to disengage the same with the pawl (*e'*) upon the descent of the foot lever, the opposite end of the bar V' being prevented from rising too high by a pin ($g$) in the top of another post ($g'$). The foot lever is connected to the end of the transverse lever V by a rod ($h$). W, is a catch bar secured to the post ($f$) by a pin ($i$) and is for the purpose of catching over the end of the foot lever V when depressed and holding it in that position until released by the lifting lever striking against an arm ($i'$) projecting from said catch bar $w$ after the log has been set,—the movement of the catch bar being governed by a pin ($i^2$) in the post ($f$).

X is another lever also arranged longitudinally beneath the frame, having its fulcrum in a post ($j$) and one end attached to the transverse lever $v$, and a short stud ($k$) projecting from opposite end to receive and support the inner end of the shaft V. Y is said shaft arranged parallel with the shaft of the rag wheel, with one of its bearings in the frame and the other in the end of the lever X, and having a pinion Z thereon which is made to match with the rack Q of the carriage upon the descent of the foot lever V to wind a cord ($l$) to which a weight ($l'$) is attached, around the shaft Y as the carriage is gigged back to relieve the tightening lever I from the band G, and permit said tightening lever I to rise and bear against the band H by the depression of its upper end with the lever T.

$m$ is a cam fixed to the face of the rag wheel O for lifting a lever to actuate the turning bar, and also to disengage the catch bar $w$ from the end of the foot lever V.

$n$ is the lifting lever, secured to the frame by a pin ($o$).

$p$ is a sliding bar secured on the frame by a pin ($p'$) and having an arm ($p^2$) projecting from its inner end against the end of the lifting lever ($n$) when the carriage has reached the extreme of its forward movement, for moving said lever ($n$) in a position to be lifted by the cam ($m$). ($q$) is a weighted turning bar, secured in suitable bearings ($r\ r'$) in the head and tail blocks, one of which ($r'$) is a round piece of metal having a square opening corresponding with the bar ($q$) and confined to the head block by a band ($r^2$) by which it is permitted to turn with said bar ($q$) and move horizontally on the same in moving the head block to suit different lengths of logs.—($q'$) is a weighted arm, projecting from the bar ($q$) in such manner as that it shall be immediately over the end of the lifting lever ($n$) when the log is to be set ready for another cut.

$s, s, s, s$ are upright turning bars, two of which being secured on the shafts ($m'$) of the head and tail blocks, and two upon the turning bar ($q$) and connected together by rods ($t\ t$) so that when the arm ($q'$) of the turning bar is elevated by the lifting lever ($m$) the gage bars ($s\ s$) of the turning bar, will be made to approach the bars ($s\ s$) of the head and tail blocks as seen in Fig. 6 and thus through the agency of the connecting rods ($t\ t$) the bars ($s\ s$) are made to move simultaneously and with them the transverse shafts M' and pinions M of the head and tail blocks and thus move the slides to which the log is dogged. These bars ($s\ s$) are provided with a series of holes ($u\ u$) into which the ends of the connecting rods ($t\ t$) are secured by nuts ($u'\ u'$) in such manner as to gage the movement of said bars ($s\ s$) and consequently govern the thickness of the timber to be cut.

$v, v,$ are two bars each fixed to posts ($v'\ v'$) secured to the head and tail blocks by pins ($v^2\ v^2$) and extending over the slides K' and L' and connecting with two eccentrics ($w\ w$) fixed on the turning bar, by loops ($w^2\ w^2$) in such manner as the bars ($v\ v$) shall be held down upon the slides during the operation of sawing, and raised simultaneously with the turning of the bars ($s\ s$) to move the log.

$x\ x$ are the dogs, for holding the log firmly on the slides; they are constructed with a turning or branch arm ($z$) Fig. 1, for taking a second and bracing hold upon the ends of the log.

$J^2$ is the cam on the end of the carriage for moving the bar $p\ p^2$ and end of the lifting lever ($n$) horizontally toward the rag wheel, in a position to be lifted by the cam ($n$) to set the log.

Having in connection with the description of the several parts of this saw mill partly described the operation of the same, I need not therefore repeat in full the operation of the machine.

The carriage J being at the extreme of its receding movement and the log properly dogged to the slides of the head and tail blocks, and set ready for the action of the saw, as seen in Fig. 1, the weighted arm ($q'$) of the turning bar ($q$) being in a depressed position, and the foot lever V elevated, and the reaching arm (R) engaged with the rag wheel ($o$) and the weight ($l'$) resting upon the lower portion of the tightening lever (I) to tighten the band G, as seen in Fig. 2, the carriage is made to move forward by the pinion (P) on the shaft of the rag wheel $o$ until it has reached the extreme of its forward movement, during which time the cam ($m$) revolving with the rag wheel having moved the lifting lever ($n$) with the sliding bar ($p$) toward the carriage, ready for the action of the cam ($J^2$) on the end of the carriage, on gigging back the same. The attendant then places his foot upon the lever (V) and depresses it, and at the same time elevates the bar (V') which disengages the reaching arm R from the teeth of the rag wheel $o$ and stops the motion of the carriage; at this moment the lower end of the catch bar (W) is made to catch over the end of the foot lever V and the levers (T) (U) (X) simultaneously therewith are made to descend by the connecting rod (h) and engage the pinion Z of the shaft (Y) with the rack Q of the carriage, and the upper end of the tightening lever I made to descend and cause its lower portion to rise and bear against the band H, and thus give motion to the rag wheel, and pinion of the shaft (Y) and wind-up the weight ($l'$) in gigging back the carriage, during which operation the cam $J^2$ on the end of the carriage comes in contact with the sliding bar (p) and moves the same with the lifting lever n toward the rag wheel o in a position to be lifted by the cam (m) and with it elevate the weighted arm ($q'$) and turn the bar (q) and relieve the holding bars (v) (v) from the slides (K') (L') and at the same moment turn the upright gage bars (s s) of the turning bar, and with them the gage bars (s s) of the transverse shafts (M') (M') and thus actuate the pawls (N) attached to the latter, and move the slide (K') (L'') simultaneously the same distance, and thus the log is set, for another cut. At this moment the lever (n) will have reached its highest point by the cam (m) and strikes the arm ($r'$) of the catch lever W and disengages the same from the end of the foot lever, when it is made to rise by means of the upper end of the tightening lever I bearing upward against the end of the lever (T) and thus cause the levers (V) (X) to rise therewith and depress the inner end of the lever (X) and with it disengage the pinion (Z) from the rack of the carriage, and cause the weight $l'$ to unwind and descend upon the tightening lever I and tighten the band G, and thus the carriage is made to move forward simultaneously with the motion of the saw.

In order to gage the movement of the slides of the head and tail block to cut different thicknesses of timber, the ends of the connecting rods (t) attaches to the gage bars (s s) of the turning bar q, must be raised or lowered and secured in one of the holes (a) therein, and the end attached to the gage bars of the transverse shafts (M') must in the same manner be lowered or raised to increase or decrease the sweep of said gage bars, and consequently turn the pinions M and shafts M' more or less, and move the slides with the log for a thick or thin cut,—thus by elevating the ends of the connecting rods attached to the gage bars, of the turning bar, q and depressing the ends of said rods on the opposite gage bars, the same distance, the thickness of the boards will be increased, and reversing the position of the connecting rods, the thickness of the board will be decreased and so on in the same ratio with the movement of the gage bars. The weighted arm ($q'$) of the turning bar is of sufficient gravity to cause the same to descend, and with it turn the upright gage bars in a position for another set.

Having described the nature of my improvements and the connection and operation of the several parts of the saw mill, what I claim as my invention and for which I solicit Letters Patent is—

1. The combination and arrangement of the levers T, U, V X (n) with the catch bar W, cam (m) and sliding bar (p) by which the depression of the foot lever V, is made to actuate the several levers T, U, X, (n),— and the cam (m) made to lift the lever (n) and thus operate the turning bar (q) and with the gage bars (s s) and thus set the log,—and at the same operation elevate the foot lever V and engage the reaching arm R, with the rag wheels Q to feed the carriage forward as described and represented.

2. I also claim the combination of the upright gage turning bars (s, s) with the horizontal weighted turning bars (q) holding bars (v v) and eccentrics (w w) thereon, by which the log is set simultaneously at both ends, and the slides K' and L' prevented from moving during the operation of sawing by the holding bars (v) (v) as described and set forth.

3. I also claim the arrangement of the shaft Y and pinion Z, for engaging with the rack of the carriage, simultaneously with the descent of the foot lever, for winding up a cord and weight, for relieving the tightening lever from the band G, and unwinding the same, with the ascent of the foot lever V, after the setting of the log, and gigging back of the carriage to give motion to the crank shaft C, as described and set forth.

In testimony whereof I have hereunto signed my name before the subscribing witnesses.

WAITMAN DAVIS.

Witnesses:
 WM. P. ELLIOT,
 A. E. H. JOHNSON.